United States Patent
Möck et al.

(10) Patent No.: US 6,767,623 B1
(45) Date of Patent: Jul. 27, 2004

(54) SANDWICH PANEL

(75) Inventors: Christof Möck, Mannheim (DE); Hermann Tatzel, Weinheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 213 days.

(21) Appl. No.: 09/714,191

(22) Filed: Nov. 17, 2000

(30) Foreign Application Priority Data

Dec. 10, 1999 (DE) .......................................... 199 59 652

(51) Int. Cl.[7] ................................................. B32C 3/26
(52) U.S. Cl. ............................. 428/318.6; 428/318.4; 428/319.3; 428/319.7; 428/317.9
(58) Field of Search .................... 428/318.4, 318.6, 428/319.3, 319.7, 317.9

(56) References Cited

U.S. PATENT DOCUMENTS

| | | | | |
|---|---|---|---|---|
| 4,866,110 A | * | 9/1989 | Lee | 524/11 |
| 5,122,398 A | * | 6/1992 | Seiler et al. | 293/120 |
| 5,164,257 A | * | 11/1992 | Haardt et al. | 428/310.5 |
| 5,180,628 A | * | 1/1993 | Haardt et al. | 428/215 |
| 5,514,458 A | * | 5/1996 | Schulze-Kadelbach et al. | 442/56 |
| 5,817,420 A | * | 10/1998 | Murakami et al. | 428/424.8 |
| 5,876,534 A | * | 3/1999 | Erhardt | 203/6 |
| 5,954,403 A | * | 9/1999 | Mock et al. | 297/452.18 |
| 6,253,527 B1 | * | 7/2001 | De Zen | 52/745.05 |

FOREIGN PATENT DOCUMENTS

| | | | | |
|---|---|---|---|---|
| CA | 2136773 | | 5/1995 | |
| CA | 2189319 | | 5/1995 | |
| DE | 37 22 873 | | 4/1989 | |
| DE | 195 44 451 | | 6/1997 | |
| DE | 19544451 A1 | * | 6/1997 | B32B/5/18 |
| EP | 0 657 281 | | 6/1995 | |
| EP | 0 771 644 | | 5/1997 | |
| JP | 5-154861 | * | 6/1993 | |
| JP | 5-169479 | * | 7/1993 | |

OTHER PUBLICATIONS

Translation of DE 195 444 51, Molitor et al, Jun. 6, 1997, 5 pages.*

* cited by examiner

*Primary Examiner*—Terrel Morris
*Assistant Examiner*—Hai Vo
(74) *Attorney, Agent, or Firm*—Keil & Weinkauf

(57) ABSTRACT

The invention relates to a sandwich panel comprising
  A. a core layer of polypropylene particle foam,
  B. cover layers of fiber-reinforced polypropylene and also optionally
  C. decorative layers,
wherein the core layer includes from 1 to 30% by weight of recyclate particles of components A, B and optionally C.

20 Claims, No Drawings

SANDWICH PANEL

This invention relates to a sandwich panel comprising
A. a core layer of polypropylene particle foam,
B. cover layers of fiber-reinforced polypropylene and also optionally
C. decorative layers.

Such sandwich panels are known, for example from DE-A 195 44 451. They are used for producing motor vehicle parts. Motor vehicle part production by stamping produces appreciable waste. It is an object of the present invention to recycle this waste.

We have found that this object is achieved, surprisingly, when the comminuted waste is added in amounts from 1 to 30% by weight in the production of foam panels from which new sandwich panels can be produced with only insignificantly inferior mechanical properties.

The present invention accordingly provides a sandwich panel as claimed in claim 1. The invention further provides a process for producing a foam panel as claimed in claim 5.

The polypropylene of the particle foam of the core layer can be a homopolymer or a copolymer with from 0.5 to 15% by weight of ethene and/or 1-butene. Its crystallite melting point is generally in the range from 120° to 170° C. The foam particles are produced by impregnating polypropylene minipellets with a volatile blowing agent in aqueous suspension and foaming by expansion. Foam extrusion is also possible. The particle size is customarily in the range from 2 to 8 mm, the bulk density in the range from 10 to 100 g/l.

The polypropylene of the cover layers is a homopolymer or a (graft) copolymer with maleic anhydride or acrylic acid. The cover layers preferably include from 10 to 60% by weight of glass, natural or polymeric fibers in the form of mats, nonwoven scrims, wovens or short fibers. Preference is given to glass mat reinforced polypropylene having a fiber content of from 20 to 50% by weight.

The decorative panels comprise a fiber web composed of polyester or polyamide, polymeric films or a foam film optionally laminated with a film. They may also be colored.

According to the invention, the core layer includes from 1 to 20%, preferably from 2 to 10%, by weight of recyclate particles of components A, B and optionally C. The recyclate in question is obtained for example from the waste of producing motor vehicle parts by stamping sandwich panels. Corresponding parts from end of life vehicles can also be used. These waste parts are comminuted, for example in mills with screen inserts, in which case the foam structure of the core layer remains substantially intact and the polypropylene does not melt. If desired, a portion of the fibers can be separated off by a cylinder screen machine. The recycled material has an average particle size of from 5 to 10, preferably from 6 to 8 mm. This material is then premixed in amounts from 1 to 20% by weight with virgin polypropylene foam particles and fed to the fill vessel of a molding machine. There, the particles are welded with steam in a conventional manner to form a foam panel.

This foam panel is then preferably used as core layer A in the production of the sandwich panel of this invention. First, the two faces of two cover layer panels B are heated to about 200° C., and the decorative material C is placed on each of the faces. Then a foam panel A is inserted between the two cover layers and the assembly is introduced into a thermoforming mold and molded. It is also possible to pressmold the layers at temperatures above the softening point of polypropylene.

The thickness of the core layer A is in the range from 3 to 20 mm, that of the cover layers in the range from 0.5 to 2 mm; the decorative layers can be from 1 to 5 mm in thickness as fiber web or as foam film or from 1 to 3 mm in thickness as polymeric films.

For recyclate concentrations in the core layer of up to 10% by weight, no significant deterioration in the strength values is observed.

The sandwich panels of the invention can be used for producing motor vehicle parts, such as trunk floors, parcel shelves and side door trim.

We claim:

1. A sandwich panel, comprising:
   (A) a core layer of polypropylene particle foam based on foam particles with a particle size in the range from 2 to 8 mm and a bulk density in the range from 10 to 100 g/l between
   (B) two cover layers of fiber-reinforced polypropylene, each of said cover layers having a face opposite the core layer; and
   (C) optionally, a decorative layer on each of the faces, wherein the core layer A comprises from 1 to 10% by weight of recyclate particles of components A, B and optionally C having an average particle size of from 5 to 10 mm and wherein the foam structure of the core layer remains substantially intact.

2. A sandwich panel as claimed in claim 1, wherein the cover layers B include from 10 to 60% by weight of glass, natural or polymeric fibers in the form of mats, nonwoven scrims, wovens or short fibers.

3. A sandwich panel as claimed in claim 2, wherein the cover layers include from 20 to 50% by weight of glass mats.

4. A sandwich panel as claimed in claim 1, wherein the decorative panel comprises a fiber web, a polymeric film or a foam film.

5. The sandwich panel as claimed in claim 1, wherein the polypropylene of the particle foam in the core layer is selected from the group consisting of a polypropylene homopolymer, a copolymer of polypropylene and 0.5 to 15% by weight of ethene, a copolymer of polypropylene and 0.5 to 15% by weight of 1-butene, and a copolymer of polypropylene and from 0.5 to 15% by weight of ethene and 1-butene.

6. The sandwich panel as claimed in claim 1, wherein the polypropylene of the particle foam of the core layer has a crystallite melting point in the range of 120° to 170° C.

7. The sandwich panel as claimed in claim 1, wherein the polypropylene in the cover layers is selected from the group consisting of a polypropylene homopolymer, a graft copolymer of polypropylene and maleic anhydride, a graft copolymer of polypropylene and acrylic acid, a copolymer of polypropylene and maleic anhydride, and a copolymer of polypropylene and acrylic acid.

8. The sandwich panel as claimed in claim 1, wherein the decorative layers comprise a fiber web, wherein said fiber web comprises a polyester or polyamide, polymeric film or a foam film optionally laminated with a film.

9. The sandwich panel as claimed in claim 1, wherein the core layer comprises from 1 to 20% by weight of said recyclate particles.

10. The sandwich panel as claimed in claim 1, wherein the core layer comprises from 2 to 10% by weight of said recyclate particles.

11. The sandwich panel as claimed in claim 1, wherein the recyclate particles have an average particle size of from 6 to 8 mm.

12. The sandwich panel as claimed in claim 1, wherein the core layer is 3 to 20 mm thick.

13. The sandwich panel as claimed in claim 1, wherein each of the cover layers is 0.5 to 2 mm thick.

14. The sandwich panel as claimed in claim 1, wherein the decorative layers are 1 to 5 mm thick.

15. The sandwich panel as claimed in claim 1, wherein the decorative layers are 1 to 3 mm thick.

16. The sandwich panel as claimed in claim 1, wherein the core layer is obtained by welding 1 to 10% by weight of the recyclate particles having an average particle size of from 5 to 10 mm with 90 to 99% by weight of polypropylene foam particles.

17. The sandwich panel as claimed in claim 1, wherein the core layer is 3 to 20 mm thick and each of the cover layers is 0.5 to 2 mm thick.

18. The sandwich panel as claimed in claim 1, wherein the decorative layers each comprise a fiber web foam film from 1 to 5 mm thick.

19. The sandwich panel as claimed in claim 1, wherein the decorative layers each comprise a fiber web or a foam film from 1 to 3 mm thick.

20. A motor vehicle part selected from the group consisting of truck floor, parcel shelf and side door trim, comprising the sandwich panel as claimed in claim 1.

\* \* \* \* \*